United States Patent [19]
Morelock et al.

[11] 3,839,090
[45] Oct. 1, 1974

[54] STORAGE BATTERY PLATE

[75] Inventors: Charles R. Morelock, Ballston Spa; Peter C. Lord; Joseph L. Weininger, both of Schenectady, all of N.Y.

[73] Assignee: General Electric Company, Schenectady, N.Y.

[22] Filed: Aug. 20, 1973

[21] Appl. No.: 390,041

[52] U.S. Cl............................ 136/36, 136/65, 136/74
[51] Int. Cl. ............................................ H01m 35/04
[58] Field of Search.............. 136/36, 65, 74, 26–27, 136/38, 48, 57, 59, 64, 58

[56] References Cited
UNITED STATES PATENTS

| | | | |
|---|---|---|---|
| 591,855 | 10/1897 | Lloyd.................................... | 136/74 |
| 3,033,909 | 5/1962 | Urry...................................... | 136/59 |
| 3,690,950 | 9/1972 | Wheadon et al...................... | 136/37 |
| 3,738,871 | 6/1973 | Scholle................................. | 136/65 |

Primary Examiner—Anthony Skapars
Attorney, Agent, or Firm—Paul R. Webb, III; Joseph T. Cohen; Jerome C. Squillaro

[57] ABSTRACT

A storage battery plate comprising a frame having an open window therein, a grid in the open window, the grid consisting of a plurality of wire elements, each wire element consisting of at least a pair of twisted wires selected from the class consisting of lead and lead alloys, and a plurality of carbon fibers held in position by the twisted wires and extending radially therefrom along the length of the wire element, a terminal connected electrically to the grid, and the grid being substantially filled with battery paste to present a continuous coating of battery paste on both sides thereof.

4 Claims, 3 Drawing Figures

PATENTED OCT 1 1974          3,839,090

STORAGE BATTERY PLATE

This invention relates to storage battery plates, and more particularly, to such storage battery plates employing lead wire grids.

In U.S. Pat. No. 3,690,950 issued Sept. 12, 1972, there is described a battery plate grid formed from a fan-like conductor and a grate-like nonconductor bonded one to the other by a plurality of fusion-interlocked joints.

In U.S. Pat. No. 3,738,871 issued June 12, 1973, there is described storage battery plates of plastic and lead. Such a plate includes a plastic frame with a plurality of intersecting horizontal and vertical thin lead wires.

The present invention is directed to a storage battery plate with an improved wire grid employing unique wire elements.

The primary objects of our invention are to provide a lightweight positive storage battery plate having a strengthened wire grid, increased adhesion of the battery paste to the grid, and improved utilization.

In accordance with one aspect of our invention, a storage battery plate has a wire grid in which each wire element consists of at least a pair of twisted lead or lead alloy wires, and a plurality of carbon fibers held in position by the twisted wires and extending radially therefrom along the length of the wire element.

These and various other objects, features and advantages of the invention will be better understood from the following description taken in connection with the accompanying drawing in which.

Figure 1:
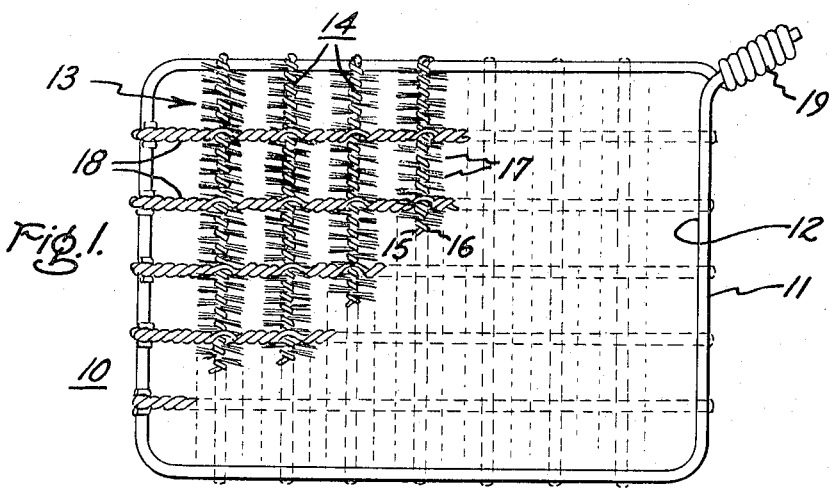
FIG. 1 is a plan view of a storage battery plate made in accordance with our invention.

In FIG. 1 of the drawing, there is shown generally at 10 a storage battery plate embodying our invention. Plate 10 is shown with a metal frame 11 of lead or of a suitable lead alloy wire which defines an open window 12 therein. A grid 13 is positioned within window 12 of frame 11. Grid 13 consists of a plurality of horizontal wire elements 14 each of which consists of at least two twisted wires 15 and 16 of lead or a suitable lead alloy, and a plurality of carbon fibers 17 held in position by the twisted wires 15 and 16 and extending radially therefrom along the length of wire element 14. Several sets of twisted wires 18 extend vertically across and are interleaved with wire elements 14 for additional structural support. Wires 18, which are also attached to frame 11 are made of lead or a suitable lead alloy. The frame wire 11 is shown twisted together at one corner to form a terminal 19 which is connected electrically through frame wire 11 to grid 13. Grid 13 is filled substantially with chemically active lead dioxide battery paste (not shown) to present a continuous coating of battery paste on both sides thereof. The battery paste, which is applied in the conventional manner is not shown so that the details of the grid can be shown in the figure. For clarity of presentation, in both FIGS. 1 and 2 the carbon fibers are depicted short of touching each other. Actually, it is preferred that carbon fibers of adjacent strands overlap each other slightly thereby better to interlock the active battery paste (not shown).

Figure 2:
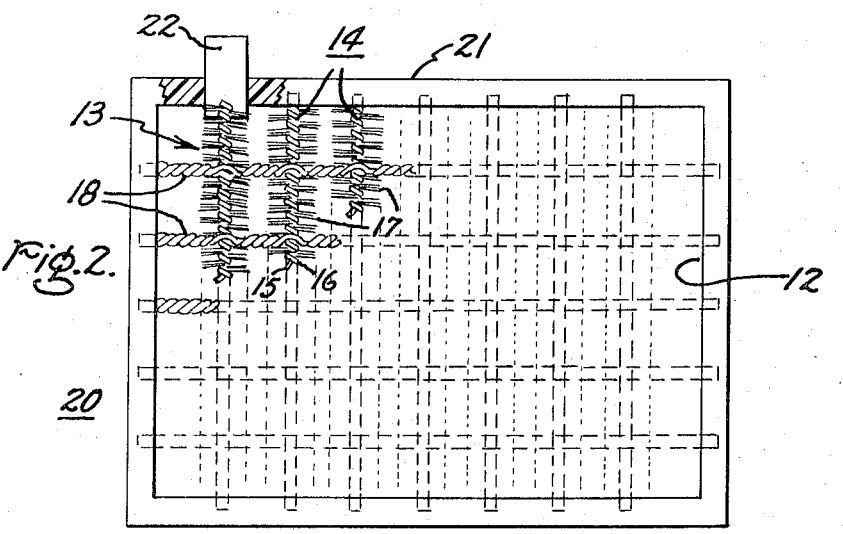
FIG. 2 is a plan view of a modified storage battery plate made in accordance with our invention.

In FIG. 2 of the drawing, there is shown at 20 a modified storage battery plate embodying our invention. Plate 20 is shown with a plastic frame 21 which is acid resistant and mechanically strong which defines as in FIG. 1 an open window 12 therein. Grid 13 is positioned within window 12 of frame 11. As in FIG. 1, grid 13 consists of a plurality of horizontal wire elements 14 each of which consists of at least two twisted wires 15 and 16 of lead or suitable lead alloy and a plurality of carbon fiber 17 held in position by the twisted wires 15 and 16 and extending radially therefrom along the length of wire element 14. Grid 13 is embedded in plastic frame 21 or the plastic frame can be fabricated around the edges of wire elements 14 to hold grid 13 in position. One or more wire elements 14 are in contact with a terminal 22 whereby grid 13 is electrically connected to terminal 22. Grid 13 is filled substantially with chemical lead dioxide battery paste (not shown) to present a continuous coating of battery paste on both sides thereof. The battery paste, which is applied in the conventional manner, is not shown so that the details of the grid can be shown in the figure.

We found that we could form an improved storage battery plate with a unique grid structure whereby the plate had a strengthened wire grid, increased adhesion of the battery paste to the grid, and improved utilization. We found that such improvements were derived by the employment in the grid structure of a plurality of wire elements in which each wire element consisted of at least a pair of twisted wires made of lead or suitable lead alloy, and a plurality of carbon fibers held in position by the twisted wires. These carbon fibers extend radially from the wire element and along segments of or its entire length.

We found that we could form such a storage battery plate by employing a frame having an open window. We found that lead and suitable alloys of lead were useable for the frame. Additionally, we found that we could also employ plastic which would be inert or resistant to the acid employed in the battery and mechanically strong to support the grid structure. Various plastic materials fulfill the requirements for the frame including polystyrene, polyethylene, polypropylene, polycarbonate and polyacrylates. A grid is positioned in the open window of the frame in various suitable manners dependent upon the type of frame employed. We found that if we used a metal frame of lead or suitable lead alloy in wire form the wire elements can be attached to the frame by twisting the ends of each wire element around the frame wire. Additionally, the metal frame can be attached to the ends of the various wire elements. If a plastic frame is employed the ends of the wire elements can be embedded therein or the frame can be formed around the wire elements.

Each wire element consists of at least a pair of twisted wires made from lead or suitable lead alloy. While we found that two such wires were suitable to provide the unique wire element of our grid structure, additional numbers of wires can be used. A plurality of carbon fibers are held in position by the twisted wires and extend radially therefrom along the length of wire element while various suitable means can be employed to position the carbon fibers within the twisted wires. We found that we could position the fibers within the twisted wires by laying a plurality of such fibers on the surface of one wire to be employed in a wire element, pressing the second wire against the first wire and twisting thereby catching the carbon fibers between the two wires and aligning the fibers radially between the length of the wire elements. We found, for example, that each 360° turn of the second wire about the first wire, about two complete twists, contained approximately 1,000 carbon fibers. A terminal in the various forms can be employed for electrical connection to the grid. For example, if a metal wire frame is employed the wires may be twisted together at one corner to form the terminal. If a plastic frame is employed a metal terminal lug can be positioned in the plastic frame and be contacted by one or more of the wire elements in the grid structure.

We found that the wire elements can be arranged in various directions. While we have shown the wire elements in both FIGS. 1 and 2 as being in a horizontal direction, other arrangements would be suitable. After the storage battery grid has been completed the grid is substantially filled in a conventional manner with battery paste to present a continuous coating of battery paste on both sides of the grid for this purpose. For example, chemically active lead oxide battery paste can be employed.

Reference has been made above to employment of lead or a suitable lead alloy in the wires of each wire element and also in one configuration of the frame structure. It will be appreciated that lead can be employed. The most desirable lead alloy for use in such a battery is a lead calcium-tin-alloy, particularly, for the wire elements. Such a wire has a composition of 0.065 percent calcium, 1 percent tin, and the balance of lead. However, while there are objections to the use of lead antimony because of the effect on battery operation such an alloy could be used.

Figure 3:
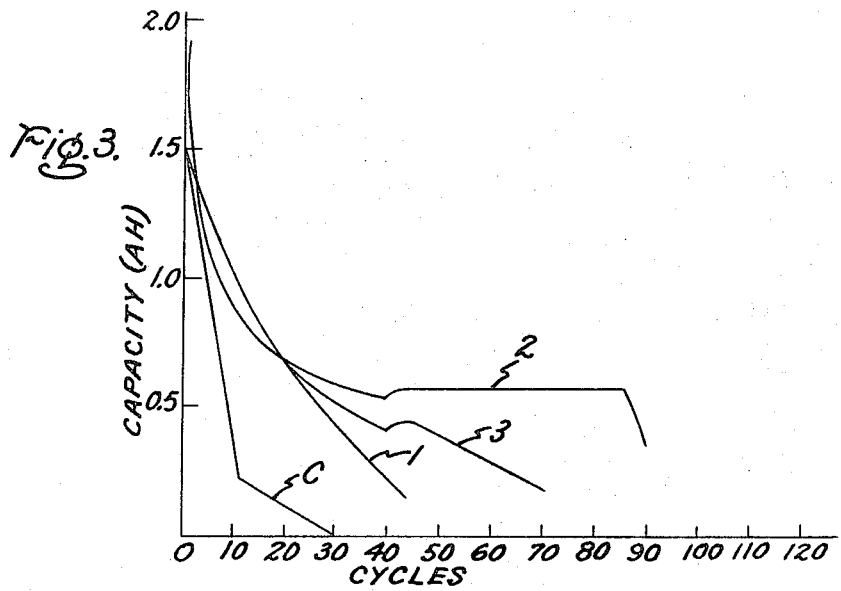
FIG. 3 is a graph plotting battery capacity in ampere-hours versus number of battery cycles.

FIG. 3 is a graph plotting battery capacity in ampere hours versus number of battery cycles for four batteries described and discussed in the Examples. The curves are labeled C, 1, 2 and 3 to correspond to the control battery, and three other batteries of which 1 and 2 include the positive storage battery plate of our invention.

Examples of storage battery plates made in accordance with our invention are as follows:

EXAMPLE I

A storage battery plate was made generally as shown in FIG. 1 and as described above. A frame having and open window therein was formed by employing pure lead wire. A grid was positioned in the open window. The grid consisted of 14 wire elements which were attached horizontally across the open window and affixed at opposite ends to the frame. Each wire element was about 4 cm in length. Each wire element consisted of a pair of twisted pure lead wires and about 30,000 carbon fibers held in position by the twisted wires and extending radially therefrom along the length of the wire element. Five lead support wires were attached vertically across the window, interleaved with the wire elements, and attached to the frame. The terminal was formed by twisting together the wire frame wire at one corner of the frame, and the grid was substantially filled with lead dioxide battery paste in a conventional manner to present a continuous coating of battery paste on both sides thereof. 12.25 grams of lead dioxide was present which is equivalent to an electrode capacity of 3.0 AH.

EXAMPLE II

The electrode formed above in Example I was employed as the positive electrode in a battery employing a sulfuric acid electrolyte, and a conventional negative plate. On discharge, a capacity of 1.40 AH at a C/6 rate gave 47 percent utilization of the positive active material. After use, visual observation indicated the positive electrode to be mechanical strong. After the above use, scanning electron micrographs were made which showed the carbon firmly embedded in the active material.

EXAMPLES III–VI

Four positive storage battery plates were prepared. The designations C, 1, 2 and 3 are employed in these Examples to identify C as the control positive plate made of expanded Pb-Ca-Sn alloy in a grid pattern, 1 as the positive plate containing lead wire elements including carbon fibers, 2 as the positive plate containing lead wire elements including carbon fibers, and 3 as the positive plate containing lead wire elements including glass fibers. Plates 1 and 2 were made in accordance with our invention. The dimensions and weights of the positive plates, the negative plates and other battery components are set forth below in Table I.

TABLE I

Dimensions and Weights of Plates and Other Battery Components

| Substrate | C<br>Pb-Ca-Sn Alloy<br>Grid Pattern<br>500/1 | 1<br>C Fiber/<br>Lead Wire | 2<br>C Fiber/<br>Lead Wire | 3<br>Glass<br>Fiber/<br>Lead Wire |
|---|---|---|---|---|
| Electrode area (cm$^2$) | 27.0 | 25.2 | 35.4 | 35.4 |
| Fiber area (cm$^2$) | — | 18.2 | 21.8 | 21.8 |
| Fiber diam. ($\mu$) | — | 3–10 | 3–10 | 12–14 |
| Pb wire diam. ($\mu$) | — | 430 | 430 | 430 |
| Substrate weight (gm) | 9.72 | 17.52 | 25.50 | 24.19 |
| Positive mix of lead dioxide (g) | 12.25 | 12.25 | 12.25 | 12.25 |
| H$_2$O (g) | 1.76 | 1.76 | 1.76 | 1.76 |
| H$_2$SO$_4$ (s.g. 1.40) (g) | 1.51 | 1.51 | 1.51 | 1.51 |
| Net wt. positive before forming (g) | 15.52 | 15.52 | 15.52 | 15.52 |
| Negative mix (g) | 14.0 | 14.0 | 14.0 | 14.0 |
| Negative substrate (g) | 9.0 | 9.0 | 9.0 | 9.0 |
| Separator (g) | 1.2 | 1.2 | 1.2 | 1.2 |
| Weight of both electrodes (g) | 45.9 | 53.7 | 61.7 | 60.4 |
| Housing and leads (g) | 16.0 | 16.0 | 16.0 | 16.0 |
| Electrolyte (g) | 26.0 | 26.0 | 26.0 | 26.0 |
| Total cell weight (g) | 86 | 96 | 104 | 102 |

Each storage battery plates 1, 2 and 3 had a grid consisting of a plurality of wire elements in which each wire element consisting of a pair of twisted lead wires and a plurality of carbon fibers held in position by the twisted wires and extending radially therefrom along the length of the wire element. A plurality of carbon fibers, about 1,000 fibers, were positioned between the two wires. One wire was twisted around the other wire for about two complete turns, or a 360° turn whereby the cabon fibers were caught and aligned radially to the wire element. This process was repeated until each wire element contained about 30,000 carbon fibers. 14 wire elements sets were prepared for plates 1 and 2. These wire sets were laid horizontally and five support wires of the same material were interleaved vertically through the 14 horizontal wire elements of each set. The edges of the wire elements and the support element were pressed between frames of 0.018 inch Pb-Ca-Sn material which were welded together on the outside of the frame. The frame had a terminal portion extending from the frame and integral therewith. Thus, each storage battery plate 1 and 2 had a frame having an open window therein with a grid in the open window.

Storage battery plate 3 was prepared in the same manner. However, glass fibers were employed rather than the carbon fibers as in plates 1 and 2.

Each of the plates 1, 2 and 3 had its grid filled with lead dioxide battery paste and cured in the conventional manner to present a continuous coating of battery paste on both sides thereof. Each of the plates was then charged in the customary manner at a charge rate of C/20 for 24 hours in 1.05 s.g. acid, and then at a charge rate of C/24 for 20 hours in 1.28 s.g. acid. Before each charging step the plates were soaked in the acid electrolyte for 1 to 2 hours.

Each of the positive plates C, 1, 2 and 3 was assembled with an associated lead-coated copper screen negative plate, and a sulfuric acid electrolyte to form four corresponding batteries C, 1, 2 and 3.

EXAMPLES VII–X

Batteries C, 1, 2 and 3 formed above in Examples III–VI were cycled at constant current to cut-off voltages of 2.70 volts on charge and 1.75 volts on discharge. With these conditions the charge rate varied with cycle life, but except for the first few cycles, during which capacity decreased rapidly, the rates were approximately C/2 for battery C and battery 1, and C/4 for batteries 2 and 3. For batteries 2 and 3, the rate was changed to C/6 after 40 cycles.

A plot of the above cycle life is shown in FIG. 3 where capacity in ampere hours is shown versus number cycles for the batteries C, 1, 2 and 3. An arbitrary failing limit of 0.50 AH capacity was selected for comparison of the batteries.

As shown in the graph of FIG. 3, battery C failed after about 10 cycles. Battery 1, of similar electrode area to battery C, failed after about 28 cycles. Batteries 2 and 3, which were of similar electrode area, failed after about 35 cycles and about 90 cycles, respectively. It will be noted that capacity versus cycles is similar for batteries 1, 2 and 3 until cycle 25 but the difference between batteries 1, 2, 3 and the battery C was pronounced within the first 10 cycles. The difference in cycle life between batteries 2 and 3 was substantial.

EXAMPLE XI

A storage battery was made generally as in Example I. However, each wire element had a plurality of carbon fibers held in position by the twisted wire along segments of the Pb-Ca-Sn alloy wire element as opposed to the entire length of the lead wire element. Support wires were interleaved through the wire elements at segments which did not contain carbon fibers. A frame was affixed to the grid by setting the grid in a jig and melting a Pb-Ca-Sn alloy around the periphery of both the wire elements and the support element. A terminal was formed in the same manner.

While other modifications of the invention and variations thereof which may be employed within the scope of the invention have not been described, the invention is intended to include such as may be embraced within the following claims.

What we claim as new and desire to secure by Letters Patent of the United States is:

1. A storage battery plate comprising a frame having an open window therein, a grid in the open window, the grid consisting of a plurality of wire elements, each wire element consisting of at least a pair of twisted wires selected from the class consisting of lead and lead alloys, and a plurality of carbon fibers held in position by the twisted wires and extending radially therefrom along the length of the wire element, a terminal connected electrically to the grid, and the grid being substantially filled with battery paste to present a continuous coating of battery paste on both sides thereof.

2. A storage battery as in claim 1, in which the frame is a metal selected from the class consisting of lead and lead alloys.

3. A storage battery as in claim 1, in which the frame is a plastic which is acid resistant and mechanically strong.

4. A storage battery as in claim 1, in which the wires of each wire element are a lead alloy of lead-calcium tin.

* * * * *